US006745236B1

(12) United States Patent
Hawkins et al.

(10) Patent No.: US 6,745,236 B1
(45) Date of Patent: Jun. 1, 2004

(54) NETWORKED COMPUTER GAME SYSTEM WITH PERSISTENT PLAYING OBJECTS

(75) Inventors: William M. Hawkins, Palo Alto, CA (US); Oren J. Tversky, Stanford, CA (US); Nick Robins, San Francisco, CA (US); Stewart K. Hester, Redwood City, CA (US)

(73) Assignee: William M. Hawkins, III, Atherton, CA (US)

( * ) Notice: Subject to any disclaimer, the term of this patent is extended or adjusted under 35 U.S.C. 154(b) by 0 days.

(21) Appl. No.: 09/442,120

(22) Filed: Nov. 17, 1999

Related U.S. Application Data

(63) Continuation of application No. 08/644,020, filed on May 9, 1996, now Pat. No. 6,009,458.

(51) Int. Cl.[7] .......................... G06F 15/16; A63F 13/12
(52) U.S. Cl. ............................ 709/218; 463/29; 463/42
(58) Field of Search ........................ 709/203, 217–219; 463/29, 42; 705/1, 37, 80, 500

(56) References Cited

U.S. PATENT DOCUMENTS

| | | | |
|---|---|---|---|
| 4,378,118 A | | 3/1983 | Leonardi, Jr. |
| 4,552,360 A | | 11/1985 | Bromley et al. |
| 4,569,526 A | | 2/1986 | Hamilton |
| 4,613,134 A | | 9/1986 | Tobin |
| 4,930,074 A | | 5/1990 | McCarthy |
| 5,125,671 A | | 6/1992 | Ueda et al. |
| 5,184,830 A | | 2/1993 | Okada et al. |
| 5,356,151 A | | 10/1994 | Abecassis et al. |
| 5,359,510 A | | 10/1994 | Sabaliauskas |
| 5,393,062 A | | 2/1995 | Cember |
| 5,409,234 A | | 4/1995 | Bechter |
| 5,498,003 A | | 3/1996 | Gechter |
| 5,533,124 A | * | 7/1996 | Smith et al. .................. 705/57 |
| 5,547,202 A | * | 8/1996 | Tsumura ...................... 463/29 |
| 5,550,976 A | * | 8/1996 | Henderson et al. ......... 709/201 |
| 5,664,998 A | | 9/1997 | Seelig et al. |
| 5,672,131 A | | 9/1997 | Osborne et al. |
| 5,674,127 A | * | 10/1997 | Horstmann et al. ........... 463/42 |
| 5,689,561 A | * | 11/1997 | Pace .......................... 705/55 |
| 5,704,837 A | | 1/1998 | Iwasaki et al. |
| 5,732,400 A | * | 3/1998 | Mandler et al. ............... 705/26 |
| 5,774,125 A | | 6/1998 | Suzuoki et al. |
| 5,872,973 A | | 2/1999 | Mitchell et al. |
| 6,009,458 A | * | 12/1999 | Hawkins et al. ............ 709/203 |
| 6,115,036 A | * | 9/2000 | Yamato et al. .............. 345/723 |
| 6,200,216 B1 | * | 3/2001 | Peppel .......................... 463/1 |

FOREIGN PATENT DOCUMENTS

| | | |
|---|---|---|
| EP | 0588625 | 3/1994 |
| GB | 2092796 | 8/1982 |

OTHER PUBLICATIONS

Curtis, P.; Nichols, D.A., "MUDs grow up: social virtual reality in the real world", Feb. 28–Mar. 4, 1994, Compcon Spring '94, Digest of Papers, pp.: 193–200.*

(List continued on next page.)

*Primary Examiner*—Jason D. Cardone
*Assistant Examiner*—Douglas Blair
(74) *Attorney, Agent, or Firm*—Townsend and Townsend and Crew LLP

(57) ABSTRACT

The mapping of playing objects from one game to another. In one embodiment, generic attributes of an object may be mapped to game-specific attributes. The mapping may either change or maintain the look and feel of an object. For example, a fast but lightly-armed starship in one game may be mapped to a quick but weak warrior in another game.

4 Claims, 13 Drawing Sheets

OTHER PUBLICATIONS

Claypool, M.; LaPoint, D.; Winslow, J., "Network analysis of Counter-strike and Starcraft", Apr. 9-11, 2003, Performance, Computing, and Communications Conference, 2003. Conference Proceedings of the 2003 IEEE International, pp. 261-268.*

Henfridsson, O.; Homstrom, H, "Developing e-commerce in internetworked organizations: a case of customer involvement throughout the computer gaming value chain", Dec. 2002, ACM SIGMIS Database, vol. 33, Issue 4.*

O'Connell et al. "The Void Shell, A Toolkit for The Development of Distributed Video Games and Virtual Worlds," Proceedings of First Workshop on Simulation and Interaction in Virtual Environments, Jul. 13-15, 1995, pp. 172-177.

Bowling "OMT and the Game of War," Journal of Computing in Small Colleges 10:73-83 (1995).

* cited by examiner

NETWORKED COMPUTER GAME SYSTEM WITH PERSISTENT PLAYING OBJECTS

This is a continuation application of, and claims priority to, patent application Ser. No. 08/644,020, U.S. Pat. No. 6,009,458, which was filed on May 9, 1996, and which is hereby incorporated by reference for all purposes.

BACKGROUND OF THE INVENTION

1. Field of the Invention

The invention relates to computer game systems and, more particularly, to a computer game system for use on a network, with software playing objects which persist between instantiations of a game and/or from one game to another.

2. Description of Related Art

A. Playing Objects

1. Specific to Game, Multiple Sessions

Many different kinds of games today are played using playing objects of one kind or another. In many cases, these playing objects are specific to the game being played. For example, the game of Monopoly® (Milton Bradley) is played using playing objects such as player tokens, "Chance" and "Opportunity" cards, property cards, houses and hotels. These playing objects are usable only in the game of Monopoly (including various versions thereof). Other games are available which take off from the theme of the original Monopoly game, but such games typically provide their own playing objects which may or may not look and operate in the same way as the original Monopoly game playing objects. The playing objects used in a particular session or instantiation of the game of monopoly are typically reused in the next session or instantiation of the game, and are therefore considered herein to "persist" from one instantiation or session to the next.

2. Multiple-Game Objects

Many games do exist which use a certain set of playing objects which persist from instantiation to instantiation of the game, and also are usable in different games. Card games, using an ordinary 52-card deck, are the most common examples of these kinds of games. The same playing objects, namely the cards, are reused in different sessions of a given game, as well as in different games. Another example involves the set of games Go, Gomoku and Othello, all of which can be played using a single set of tiles.

3. Expansion Objects Separate From Game

Some games, whose playing objects are game-specific, can be played using playing objects that were not provided with the original game product. For example, the game "Cosmic Encounter" by Mayfair Games is sold with a set of cards for use in the game. The publisher also sells several expansion sets of cards, which can also be used in the same game. A number of other card games and board games exist which include a set of playing objects sold with the product, but then have additional card sets created for them.

4. Look And Feel

In some cases, when a particular playing object is usable in more than one game, the same playing object is used within all games. For example, a physical tile used in Go is the same as a tile used in a game of Othello. Thus, if a physical tile is considered to have any look or feel, it remains unchanged.

In other cases, the rules of a game give a different look and feel or value to an identical playing object. For example, an ace might be "high" in one card game and "low" in another card game.

5. Object With Value Outside Game

The game of "Magic: The Gathering", (published by Wizards of the Coast, Inc., Renton, Wash.), is a game in which players battle each other using decks of cards which they can own and bring to a match. These playing cards can have a value outside of the game, for a number of reasons, including the following reasons. First, they have art work and fantasy text which render them collectible. Second, each user makes up his or her own deck for use in a particular session of the game, and can select cards which give the player a perceived advantage. Third, the publisher may publish fewer numbers of certain cards. As a result of the intrinsic value of Magic playing cards outside of the game, these cards are often wagered in games and/or sold or traded to other players outside of the game playing setting.

6. Modification Of Character During Game

A fantasy role-playing game is "Dungeons & Dragons", by TSR. At the beginning of a game session, each player creates a character to role play having various attributes such as strength, speed, weapons, and so on. The characters are affected by events that take place during the game session; for example, they can gain wealth by picking up a treasure.

B. Computer Games

Many card games and board games are also available as computer games. For example, game software can be found for the games of chess, checkers, poker, Monopoly, and so on. Other computer games do use game-specific playing objects which persist from session to session of the game. For example, in the game "John Madden Football", published by Electronic Arts, San Mateo, Calif., the data about individual football players is provided on a disk. This data persists through different sessions of the game, and can even change over time due to game play. For example, if a football player is injured in one session of the game, that injury affects the conduct of the player in subsequent sessions. The data sold with one version of the game can usually be used in earlier versions of the same game (i.e., data is backward compatible).

C. Network Games

With the advent of networking and the Internet, games played via a computer network have become available. One class of such games is "Multi-User Dungeon", also known as MUDs. MUDs are typically text-based fantasy role-playing games, similar to Dungeons & Dragons. Players for the most part interact with each other, but can also interact with a virtual environment. A character and its attributes persist from session to session of the game, during one instantiation of the game. For example, a player may play a MUD for an hour, gaining certain experience or weapons for the player's character. The player may then log out for a while and resume the next day in the same instantiation of the same MUD game. In some cases, the character may still have its experience and weapons gained during the player's prior session. Objects can be transferred from one player to another during game play. For example, one player can have his or her character drop a weapon that the character acquired previously in the same instantiation of the game, and another character can later find it and pick it up.

Interactive games over a network may have software for much of the graphics stored on a user's local memory, while communications over the network are used for interaction with a central server or other user for the remaining graphics, such as an opposing player. A number of different modes of communication can be used. For instance, currently Internet games use E-mail, Telnet (text based) and Internet Relay Chat.

SUMMARY OF THE INVENTION

The present invention provides for the mapping of playing objects from one game to another. In one embodiment, generic attributes (DNA) of an object may be mapped to game-specific attributes. The mapping may either change or preferably maintain the integrity, including the look and feel of an object. For example, a fast but lightly-armed starship in one game may be mapped to a quick but weak warrior in another game.

In one embodiment, the mapping function scales particular attributes according to an importance coefficient for a particular game. For example, speed may be the most important attribute in a race car game, while strength is most important in a boxing game. The attributes are also normalized, to maintain the overall value which may be distorted by scaling. Generic attributes are assigned numeric values, and are mapped to corresponding attributes in a game-specific object. Where there is no corresponding generic attribute, a default, average value, or other mechanism may be used to generate the attribute. Thus the mapping function of the DNA attributes allows for both forward and backward capability.

In one embodiment, the playing objects have an existence and value outside of any individual game. Utility programs can allow viewing of an object and its various mappings or transformations into game specific objects. The playing object could be used in other programs, such as a screen saver or as audio/visual addressing in e-mail messages, for example. Modification of a playing object either inside or outside of a game may be done by mutation, replication, recombination, etc.

The invention may be implemented independent of an electronic network, or using a network. Preferably, a central database maintains a register of playing objects and the users that own them. User Ids are assigned to playing objects to allow verification of ownership. A marketplace program allows the trading of playing objects among users, or the acquisition of new playing objects from a central authority. The marketplace program allows users to barter and acquire playing objects, and registers the results of the transactions in the central database by modifying the associated user Ids.

In yet another aspect, the system is programmed to allow a user to select a subset (or deck) of his or her playing objects for use in a particular game instantiation. Some playing objects are provided with certain predefined or dynamic exclusion criteria which limits their use in certain game instantiations or sessions. For example, playing objects can be provided with an expiration date, or expire after a predetermined number of uses, or slowly lose a specific attribute, such as strength, or be made usable only weekly, and so on.

In yet another aspect, playing objects are persistently modified over time. Such modifications can arise either through game play, or by on-line acquisition of improvements, or by another mechanism.

DETAILED DESCRIPTION

Figure 1:
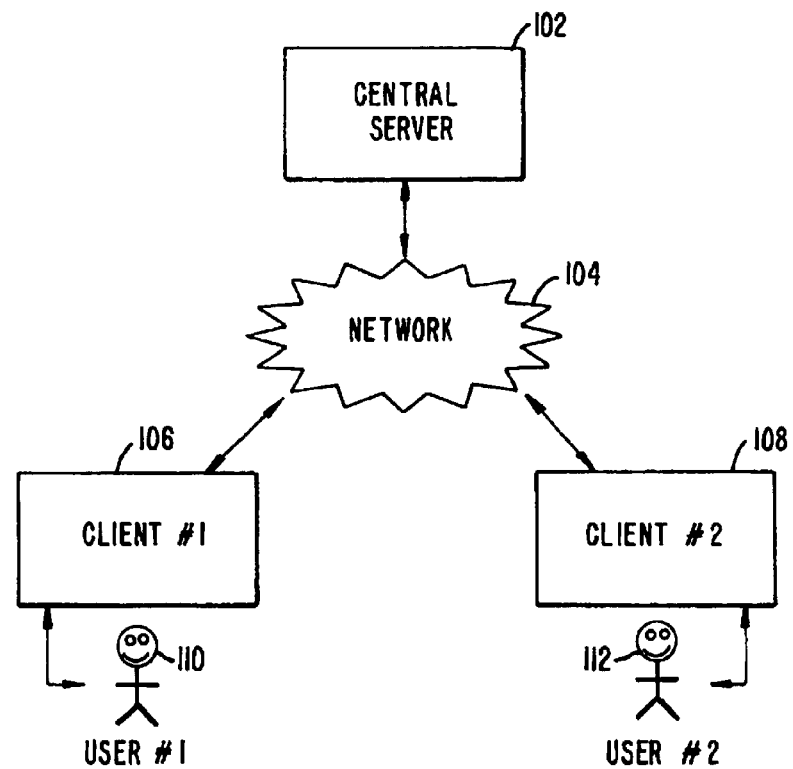
FIG. 1 is a block diagram of one embodiment of a network used by the present invention.

I. Table of Contents
  A. Definitions.
  B. Network.
  C. Playing Object Transformation Example, Display.
  D. Value.
  E. Playing Object Database.
  F. Mapping.
    1. General Mapping Algorithm.
    2. Scaling and Normalization.
    3. Forward and Backward Compatibility.
    4. Preferred Game Design Mapping Guidelines.
  G. User Hardware Example.
  H. Marketplace Program.
  I. User Interface Facility (Example Screens).
  J. Gaming Facility.
  K. Modification of Generic Playing Object Value.
  L. Overall Operation of the System—User's Viewpoint.
  M. Mutation, Replication, Recombination.
  N. Playing Object Use Outside Games.

A. Definitions

Attribute. An "attribute" is any characteristic of a playing object, and may be anything from a digitally stored abstract value to a physical shape, such as a rectangular shape of a tile.

Playing Object. A "playing object" is an object manipulated by, or which manipulates, a program. It includes at least one attribute.

DNA. "DNA" is the collection of generic attributes used in generating game-specific playing objects.

Mapping. "Mapping" is the conversion of a playing object from generic form to game-specific form, or vice-versa, or from one game-specific form directly to another game-specific form. One playing object may be mapped into many, or vice versa.

Game. A "game" is an entertainment activity engaged in for diversion or amusement that is governed by a set of rules or conventions in which a player or players interact with each other and/or the rules themselves. These rules and conventions provide a framework to allow players to move or work toward objectives or goals. As used herein, games are conducted in "instantiations" and "sessions".

Instantiations. A game "instantiation" begins at the beginning of a game pursuant to the game's rules, and ends when the game reaches its normal conclusion (either pursuant to its rules or because all the players quit). A game instantiation can be conducted in one or more "sessions".

Session. A "session" is a period during which a game is played up to a pause or conclusion. As an example, a group of players may play for several hours, take a break, and resume the next day. In this case they have played two "sessions" of a single "instantiation".

Legacy Data. The "legacy data" is data which describes or is attributable to DNA or a playing object, and could include attributes. It can include art work, sounds, animation, video and fantasy or descriptive text, or even executable code. It can be modified over time, such as by adding histories of adventures in particular games. The legacy data can be common to the DNA and mapped game-specific playing objects, or each playing object could have its own legacy data, or any combination. Identical DNA issued to different users could acquire different legacy data. Part of the legacy data could be represented on physical cards or figures sold to a user.

Computer-readable storage medium. "Computer-readable storage medium" or "processing device storage media", as used herein includes any media for storing electronic data, and can be a single unitary structure such as a single CD-ROM, or it can include more than one unitary structure, such as a collection of CD-ROMs or the combination of CD-ROMs and magnetic disks. It can include volatile and nonvolatile media, media distributed in a plurality of locations, hard disks, floppies, RAM, ROM, cache, cartridges, network media, and so on.

Network. A "network" includes any means by which two or more processing systems communicate with each other. The term includes direct electrical connections, point-to-point dial-up connections, intranets, internets, the Internet, wireless networks (cellular, satellite), etc. The processing systems can be computers, game controllers, dumb terminals, televisions, etc.

B. Network.

FIG. 1 is an overview of one embodiment of a system according to the invention. It comprises a central server 102, communicating via a network 104 with two client systems 106 and 108. The server 102 performs a number of different functions as described in more detail below, but primarily it conducts games played by users at their respective clients. For example, a first user 110 experiences the visual and audible effects of the game via the client 106, whereas a second user 112 experiences the visual and audible effects of the game via the client 108. In one embodiment, the server 102 is programmed to conduct only one game, whereas in another embodiment, the server 102 is programmed to conduct two or more different games, either sequentially or concurrently or both. The games may be played by one, two or more users.

Figure 2:
FIG. 2 is a block diagram of one embodiment of a peer-to-peer network used by the present invention.

FIG. 2 is an overview of another system according to the invention, wherein there is no central server. Rather, all of the users are connected together according to a peer-to-peer model, rather than a client/server model. In different embodiments of the invention, the different computer systems communicating with each other via the network can follow a client/server model, a peer-to-peer model, and/or any other model of distributed processing. The users need not have computers, but could have any device which generates a display, including televisions.

In each of the embodiments illustrated in FIGS. 1 and 2, two users are shown interfacing with the system. In one embodiment, the two users are playing separate instantiations of a single game, and not interacting with each other in the game. In another embodiment, the two users are playing a single instantiation of a game, and the game enables the two users to interact with each other. For example, when two users are playing against each other, part of the game might involve a race between a character controlled by the user 110 and a character controlled by the user 112. In yet a third embodiment, the two users are playing different games and not interacting with each other. For example, user 110 might be playing a racing game, whereas user 112 might be playing a fighting game.

C. Playing Object Transformation Example, Display.

FIGS. 3A and 3B, and 4A and 4B illustrate screen displays setting forth a playing object's characteristics in two different games. These screen displays may be generated, for example, in a browser which a user may access to determine whether to purchase or trade for a particular playing object. The displays could also be generated in a playing deck program used by the user to store and display the user's collection of playing objects. In addition, they could appear at the beginning of or during a game as desired. The example shown is a simple one to illustrate the concepts of the present invention.

Figure 3A:
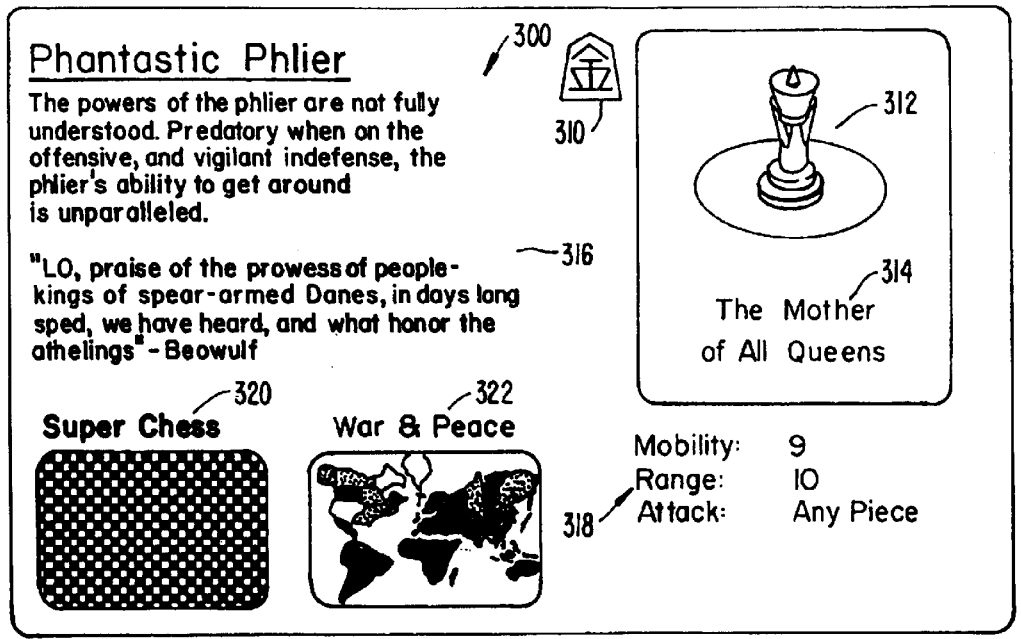
FIGS. 3A, 3B, 4A and 4B, show illustrative screen displays for different game-specific presentations of playing objects.
Figure 3B:
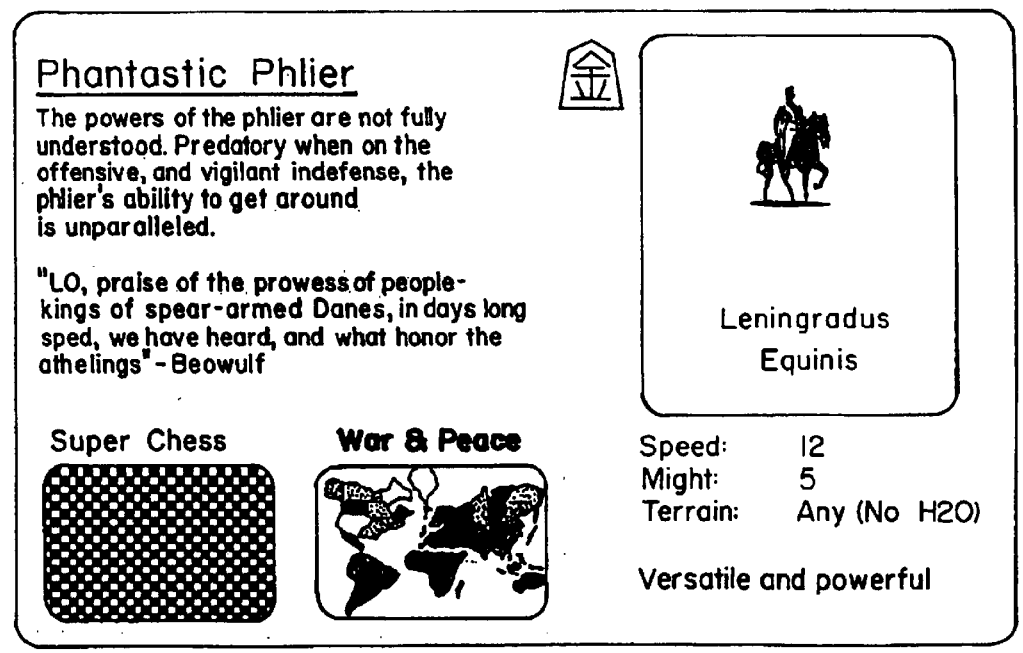
Figure 4A:
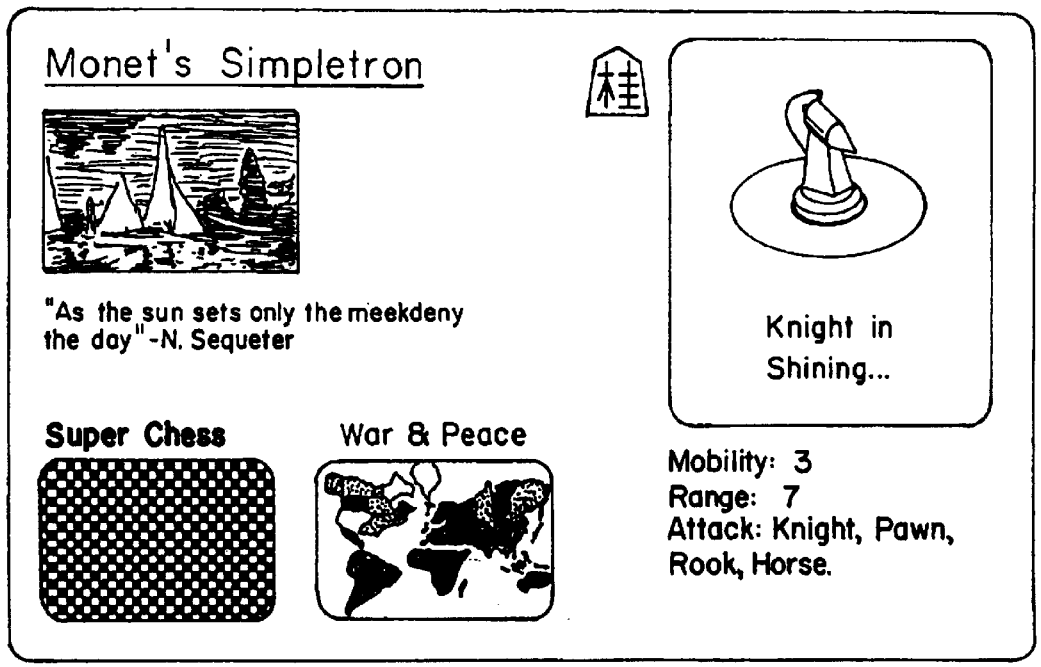
Figure 4B:
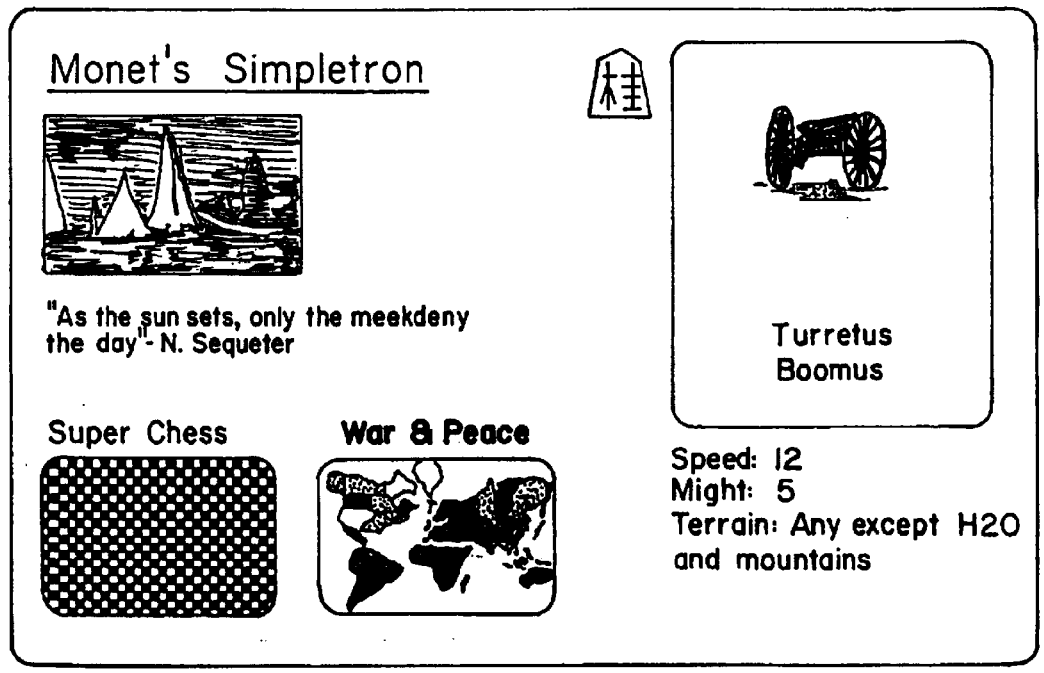

Referring to FIG. 3A, a name 300 of the playing object is shown, along with the logo 310. A picture 312 of the object is also included, along with the name of the object 314 in a particular game. Legacy data 316 describing the playing object is included as well. A listing 318 sets forth certain attributes of the playing object. Finally, a pair of icons 320 and 322 allow selection of a display of the generic playing object as translated into a game-specific playing object. FIG. 3A illustrates the transformation into the game-specific playing object for Super Chess, while FIG. 3B illustrates a translation into the game-specific object for War & Peace.

The examples of FIGS. 3A, 3B, 4A and 4B attempt to convey how DNA mapping might take place, while attempting to preserve the value, look, and feel of a given DNA.

In trying to illustrate these concepts, we will use modified versions of standard board games familiar to all. Our example uses a modified chess game, called Super Chess, and a modified Risk game, called War & Peace.

Super Chess

The rules of super Chess are similar to those of regular chess. Assume the rules are identical, except where indicated. Each DNA translates into a chess piece to be placed on the board at the start of the game. The game is set up initially just like standard chess. The following are the exceptions:

Each chess piece put down by the player has a range, which indicates the number of squares said piece may advance in any one given move. For instance, a queen in traditional chess would have a range of 8, and a pawn a range of 1. In Super Chess, however, not all queens are created equal. Some might have a range of only 1, while others may be able to leap the entire board in a single move.

Each piece also has a mobility factor which determines the number of directions and/or turns a piece may take. For instance, ordinarily a pawn can move only forward, but there are pawns in Super Chess that can move in all 8 directions. The higher the mobility, the more degrees of freedom that piece can move in.

Each piece also has an attack status. This parameter refers to the types of pieces that a particular piece may defeat. For example, pawns may only be able to take out other pawns, and not arbitrary pieces.

War & Peace

This game is Risk with a few variations. Primarily, every time a player gets new armies to put down on the board, he/she selects a playing object (from his/her deck) representing the type of army. Armies have the following properties:

Each army has a speed parameter with it which determines how many countries it may advance in a given turn.

Each army also has a set of terrain types that it can cross. For example, an amphibious division can cross oceans, while a cavalry division cannot cross the Andes.

Each army also has a might value which corresponds to an adjustment factor when attacking other armies. The higher the might value, the more powerful an army is when attacking.

FIGS. 3A–4B show how playing objects might appear to a player in a browser. Note that the information on the upper left hand corner of these figures represent a portion of the legacy data: generic information that is preserved across all games. Such information may include the playing object's name of the piece (e.g. Monet's Simpletron), its logo, an animation, a sound, an image, a quote, and/or a general description of the piece. The right hand side of the screen conveys game-specific legacy or attribute information for the selected game. Two example playing objects are shown (Phantastic Phlier and Monet's Simpletron) and their instantiation in each game (Super Chess and War & Peace). Each instantiation may include any or all of the following information about the playing object in that game: a name, sound, icon, description of its functionality, and a list of attributes and associated values.

Phantastic Phlier

Clearly the Phantastic Phlier playing object is of great value. Presumably, any such piece would be rare. In chess, the phlier becomes the "Mother of all Queens" and can move up to ten squares in a given move, in any direction and take out any piece. In War & Peace, the phlier transforms into Leningradus Equinis with a high speed, a solid might value and the ability to cross any terrain save water.

Monet's Simpletron

In Super Chess this playing object is of reasonable value with limited mobility but good range, and can attack Knights, Pawns, Rooks and Horses. In War & Peace, the simpletron becomes a turreted army with good speed, the ability to cross all terrain save mountains and water, and a decent might value.

Mapping

Our mapping algorithm might map the DNA in the following way:

|  | "Quickness" attribute | "Power" attribute | "Mobility" attribute |
| --- | --- | --- | --- |
| Super Chess | Range | Attack | Mobility |
| War & Peace | Speed | Might | Terrain |

So, range in Super Chess becomes speed in War & Peace, attack becomes might and mobility translates into terrain traversal ability.

Value

By mapping attributes appropriately and scaling values accordingly, we are able to preserve the value of a given playing object across games. For instance, we can see that the phlier is a valuable, powerful playing object in both games. Likewise, the simpletron is of average value in both games.

Feel

Our mapping algorithm mapped the mobility in the chess game to the ability to traverse certain types of terrain. A "mobile" piece such as the phlier, can move in any direction on the chess board, and cross most terrains in the risk game. In this manner we attempt to preserve some sort of intuitive notion of the behavior of a given playing object across games. Obviously, for some games this might be difficult to do.

Look

By having legacy data that persists across all games and the use of icons, sounds and the like, we attempt to preserve some of the visual aspects of a given playing object across games.

D. Value.

In an embodiment, the different playing objects have a real world value. The value may arise because of at least one of the following factors.

1. Legacy Data. The different playing objects may include a set of data and other aspects referred to herein as "legacy data". The legacy data can remain constant from game to game, or could be varied. The legacy data can be stored with the DNA attributes, or be pointed to by a pointer associated with the DNA attributes. The legacy data can give the playing objects a collectability value, similar the collectability value attached to baseball cards. The legacy data is one aspect that allows a user to develop an emotional attachment to a playing object.

2. Usefulness. The value is also impacted by the effectiveness of the playing object in different games and what the user can do with it.

3. Rarity. The central authority creating playing objects can control rarity by making few playing objects of a given value or with given characteristics. If users are allowed to replicate, mutate, recombine or otherwise alter their DNA, limitations could be placed on this ability to preserve rarity.

Note that none of the above three factors controls the real world value of a playing object. In practice, the real world value of a playing object may be determined by users interacting with each other in a real world marketplace for playing objects. The marketplace facility described below facilitates such a real world marketplace by providing a (non-exclusive) forum.

E. Playing Object Database

Figure 5:
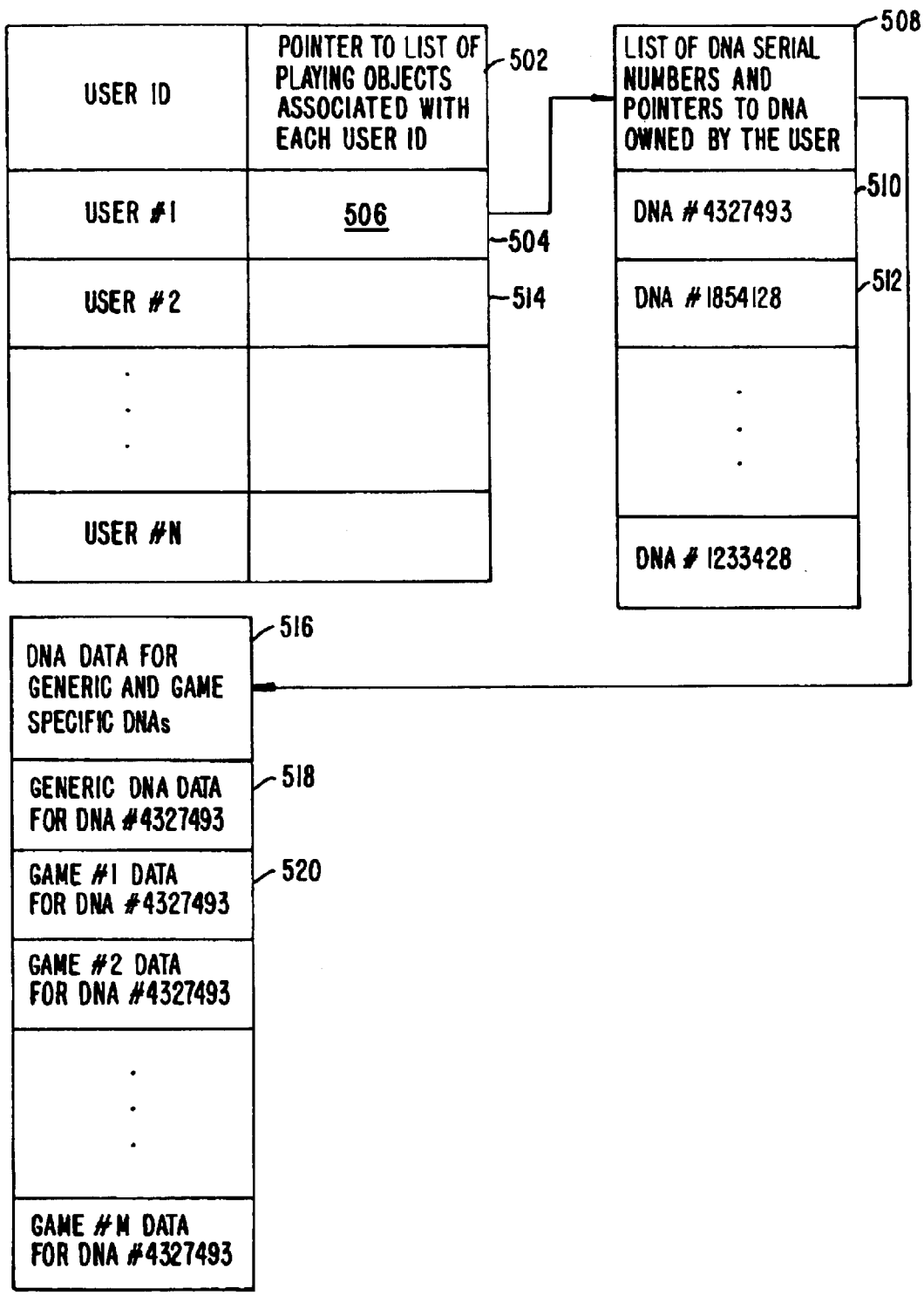
FIG. 5 is a diagram of a database associating users with playing objects.

FIG. 5 illustrates the format in one embodiment where a database facility maintains the association of playing objects with individual users. Specifically, a table 502 contains a column of user Ids in correspondence with a column of pointers to respective lists of playing objects which are associated with each user ID. It will be appreciated that while the system associates playing objects with individual users, it does so only by user ID number; the "user", as the term is used herein, can in actuality comprise a group of users which are represented in the database facility by a single user ID.

The table 502 contains a row corresponding to each user ID. In row 504, the user ID column contains the identification number for user #1 and the pointer column contains a pointer 506 to a list 508 of identifiers for the playing objects which are associated with user #1. The list contains the identifiers (DNA #) for a playing object 510, a playing object 512, and so on. Similarly, a row 514 in the table 502 contains the identification number and pointer of user #2.

The table 502 also may contain rows with a pointer to a list of identifiers of playing objects which are not then associated with any user. The playing objects on such a list are available for acquisition by users.

All of the playing objects whose identifiers are included on any of the lists which are referred to in FIG. 5, make up the universe of playing objects which exist at any one time and are usable in the games supported by the gaming facility.

A further breakdown of the data stored for playing object 510, with its given DNA serial number is set forth in list 516 in FIG. 5. This list includes generic DNA data 518 and game specific DNA data, such as data 520 for game number 1. The components of this data are shown in more detail in FIG. 6.

Figure 6:
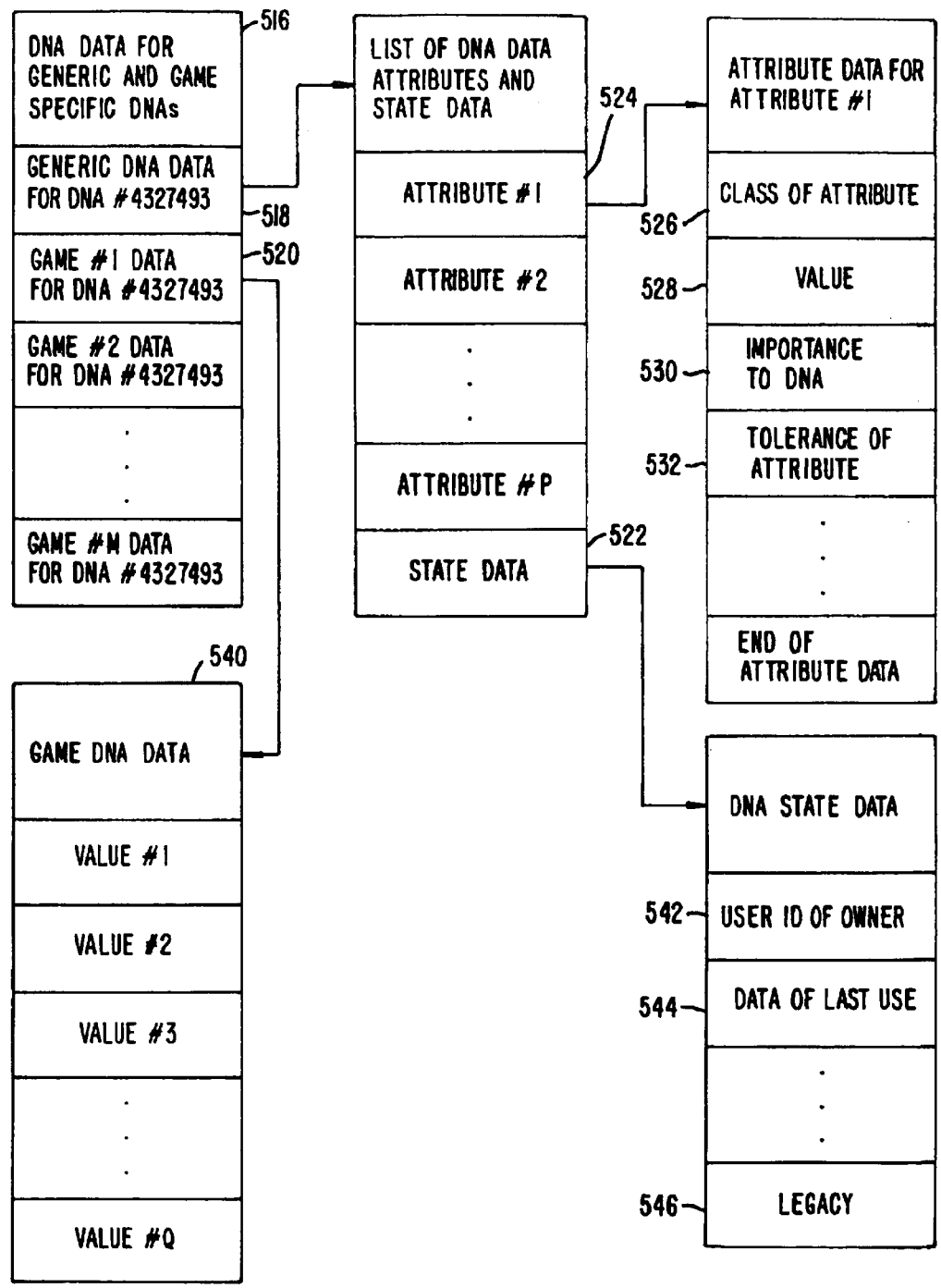
FIG. 6 is a diagram illustrating a database associating generic and game-specific playing object attributes with a playing object.

As is shown in FIG. 6, the generic DNA 518 is a block of data which includes attributes 1-P, and state data 522. An example of the data for attribute number 1, block 524, is shown as including a class 526 of the attribute, its value 528, its importance 530, and its range 532. Additional or different aspects may also be included. The class attribute 526 might indicate, for example, membership in a race class as either Human, Klingon, Vulcan, etc. A value 528 is typically a numeric quantity within a range, such as indicating a strength between 0 and 1000. The importance block 530 can be used to identify the importance of the attribute, and may be used by a mapping function to identify similar attributes or classify attributes. The tolerance 532 specifies acceptable values for the attribute, and could also be used by a mapping function to identify similar attributes.

The actual location of the attribute values may vary. For instance, in one example, all the data may be maintained on a central game facility, rather than at the user's computer. Alternately, a DNA serial number associated with the user's ID may be all that is stored on the central gaming facility, with the rest of the data being stored on a CD ROM or other storage device at the user's computer or access terminal. This would allow a peer-to-peer game, for example, without contacting a central server, except perhaps for a game authorization code, which could be obtained in advance. In addition, portions of data may be shared by playing objects.

Game DNA 520 may also be present in a number of different places and forms. In one embodiment, it is not stored at all, but a mapping function is provided either at the game facility, internally to the game, or at the user's site. The mapping could be done each time from the generic attributes, with the mapped characteristics being discarded after the game is completed. Alternately, the mapped values can be stored after the mapping function has been calculated, such as in a list 540 corresponding to game number 1 data 520. That list could have the ultimate values 1-Q determined for each of the attributes used in that game.

Finally, state data 522 associated with each user would include data which is not specific to or mapped to any particular game. That would include the user ID 542, an optional date of last use 544, or other fields. In addition, legacy data 546 would contain the information provided on the display setting forth a description of a particular playing object.

F. Mapping.

1. General Mapping Algorithm.

In general, any mapping scheme may be used, including one which inverts or otherwise modifies the value of playing objects, or modifies their look and feel. In one embodiment, a mapping scheme which preserves the playing object's relative value is used. In addition, it is preferable to also maintain the look and feel (value and "look and feel" are not the same, since the overall value could be the same, with individual attributes varied to give a different look and feel).

There can be a one-to-one mapping, or one playing object can be mapped into many, such as a race car driver in one game becoming multiple elements of ammunition in another. In another example, many playing objects can be mapped into one playing object or a different number of playing objects. Alternately, a playing object could be mapped into a manager of playing objects, such as a commander of a starship fleet.

The mapping may be done in any location and at any time. The central server may do the mapping, or the user may have a mapping algorithm stored locally for its playing objects. The mapping could be done at the central server for all available games at the time of creation of the playing object.

In one preferred embodiment, the games include the mapping algorithm. The mapping may be done before the game is begun, with mapping results stored with the generic DNA of the playing object, as illustrated in FIGS. 5 and 6. The game may prompt the user to provide an input of the generic playing object, or the user may simply provide a user ID, with the game then accessing the central server or the user's memory for the stored generic DNA, or previously translated game-specific DNA.

Any mapping algorithm may be used, such as a proportional mapping, a boolean mapping, a greater than or less than test, a combination of the above, etc.

Figure 7:
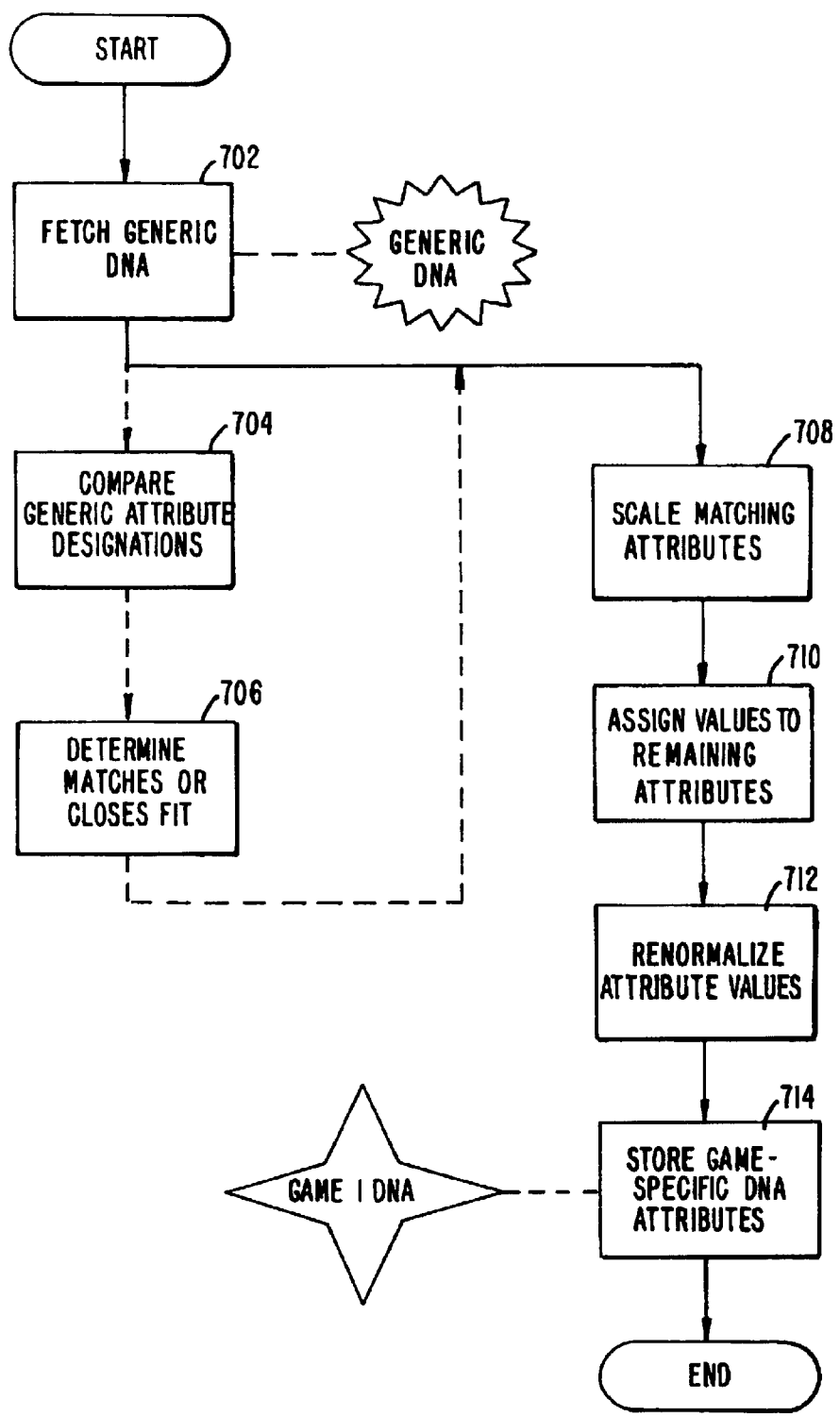
FIG. 7 is a flowchart illustrating the mapping of a generic playing object into a game-specific playing object.

FIG. 7 is a flow chart illustrating the steps performed in the embodiment described herein for mapping a playing object for use in a specific game. In Step 702, the generic DNA data is fetched by the game program. In one embodiment, the game designer knows what the DNA attributes are and where they are stored in the generic DNA data structure. Thus, the program can simply fetch certain predesignated locations. Alternately, a game can be made more dynamic, and look for attributes having a certain type tag (i.e., speed), as set forth in optional step 704. This also allows forward compatibility to new generic DNA that may have additional or differently located attributes from those in existence when the game was designed. It would also be possible to search for the most closely related attribute if there is not an identical match (optional step 706). This could be done, for example, by looking for attributes in the same class (a movement class could include speed, range, directions; a strength class could include armor, weapons, etc.).

Matching attributes are then scaled in step 708 with an importance coefficient or scaling factor which indicates the importance of that attribute in the game (i.e., speed may be more important in a car race game than a boxing game). Non-matching attributes may then be assigned a value in any number of ways (step 710). Game attributes may be given the average value of the generic attributes in the simplest example. Or remaining attributes could be randomly matched or matched by class. Or non matching generic attributes could be separately averaged and mapped to non-matching game specific attributes. A default value could be assigned for each of the attributes which are needed for the game but which are missing from the playing object.

Next, the attributes are normalized in step 712 to avoid having the scaling change the overall value, as shown in the example below. The generic attribute classification (i.e., speed) is then associated with the game specific attribute classification (i.e., quickness). Finally, the new game specific attributes are stored in step 714, either with the game data, or with the central server or user data structure as shown in FIGS. 5 and 6. Note that the order of the steps may be varied, different games may use different mapping algorithms, including algorithms different from that shown in FIG. 7.

Figure 8A:
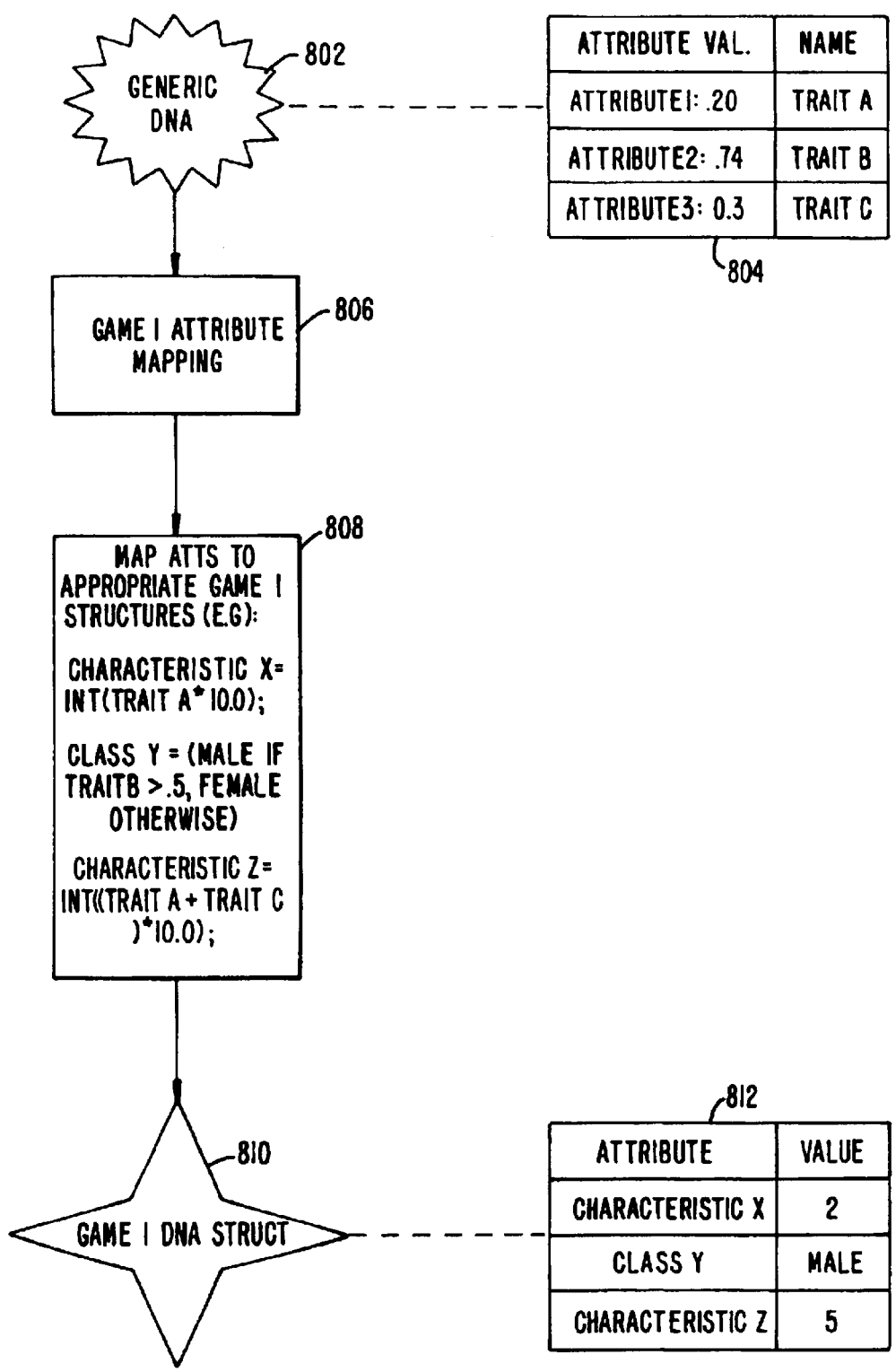
FIGS. 8A–8C are flowcharts of specific examples of a mapping according to FIG. 7.

FIG. 8A is an illustrative example of mapping for three attributes of generic DNA 802 listed in table 804. The three attribute values for traits A, B, and C are provided to a specific game, Game 1, in step 806. The mapping occurs in step 808 to the game specific DNA structure 810. As can be seen, trait A is simply multiplied by an importance coefficient, or scaling factor, of 10. Trait B is tested to see if it is greater than 0.5 to determine a class Y for Game 1, which is one of two classes, male or female. A characteristic Z of Game 1 is determined by a combination of the value of trait A and trait C, scaled by a scaling factor of 10. The resulting characteristics of a playing object for Game 1 are stored in a table 812.

Figure 8B:
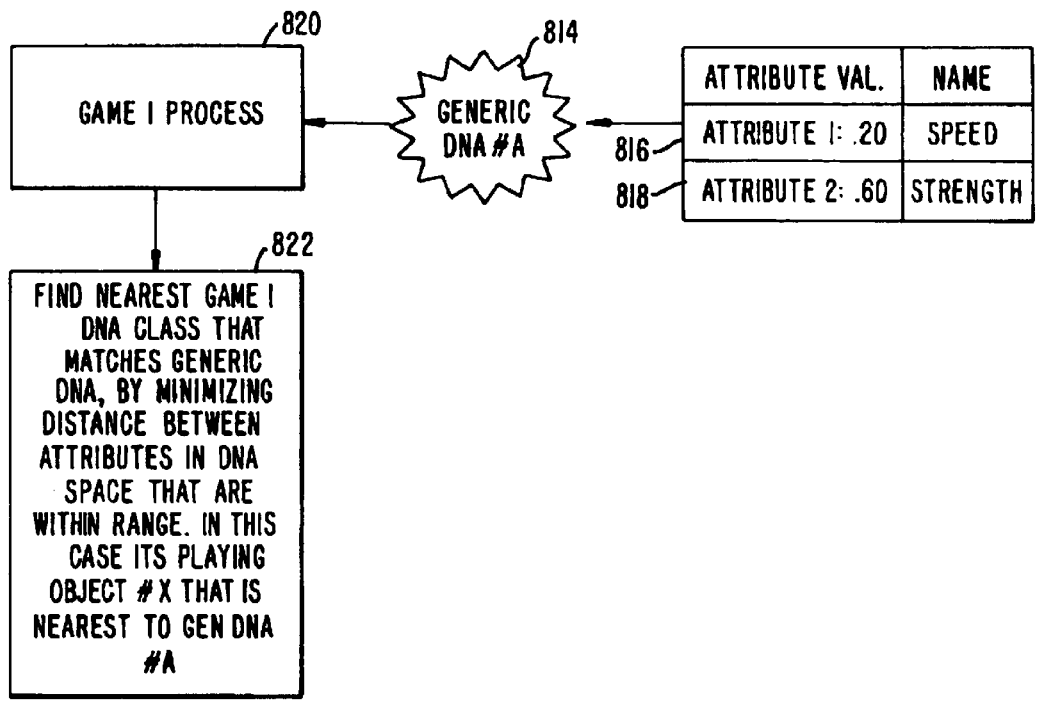
Figure 8C:
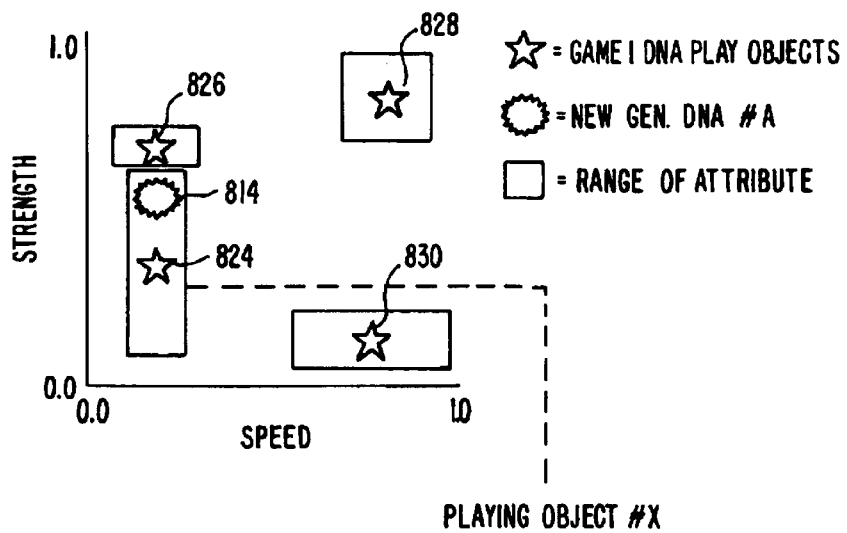

FIG. 8B is a flow chart illustrating how a new generic DNA, with attributes that do not match those of existing playing objects, can be mapped to the existing attributes. A new generic DNA 814, with new speed attribute 816 and strength attribute 818 is provided to a game 1 mapping process 820. In step 822, the nearest DNA class is determined. This can be understood by reference to FIG. 8C, which is a graph of strength vs. speed showing the new generic DNA and four playing objects, 824, 826, 828 and 830. The playing objects have their closest attributes to strength and speed mapped to strength and speed. For example, the playing objects might be chess pieces, with 828 being a rook and 830 being a bishop. For this example, the number of directions of movement could be mapped into strength, and the distance of movement could be mapped into speed. With this mapping into the generic attribute space (speed and strength), the type of playing object most closely matching the new generic DNA attributes can be determined by comparing strength and speed values to see which is closest, or, where a range is specified, which playing objects range the generic DNA falls within. Alternately, the mapping could be done in the game specific space (directions and distance), with the generic strength and speed being mapped into directions and distance first. This mapping could be done, for instance, by any number of algorithms or tags which would relate strength and direction, for instance.

2. Scaling and Normalization.

An example of the scaling step, showing why normalization is needed, will now be described for a case in which each playing object has only two attributes (SPEED and WEAPONS). Two games will be assumed, namely a race car game (game #1 and a fighting game (game #2). In this case, the intrinsic value (IV) of two playing objects A and B are defined as follows:

$$IV_A=(SPEED_A+WEAPONS_A)/2$$

$$IV_B=(SPEED_B+WEAPONS_B)/2$$

In Game 1, SPEED, which is called 'velocity' in the game's parlance, is expressed as being 1.5 times as important as WEAPONS, which are called 'guns'. In Game 2, WEAPONS, which are called 'swords', are 2.5 times as important as SPEED, which is called 'responsiveness'. Then in Game 1, A and B's values are mapped to the game-specific value (V) as follows:

$$V_A=(1.5(SPEED_A)+WEAPONS_A)/2.5$$

$$V_B=(1.5(SPEED_B)+WEAPONS_B)/2.5$$

Relative values of A and B are next restored ("normalized") by multiplying $SPEED_A$ and $WEAPONS_A$ by a factor that makes the revised $V_A=IV_A$, and by multiplying $SPEED_B$ and $WEAPONS_B$ by a different factor that makes the revised $V_B=IV_B$. The proper factors are:

$$F_A=IV_A/V_A$$

$$F_B=IV_B/V_B$$

To create a specific example, let: $SPEED_A=100$, $WEAPONS_A=500$, $SPEED_B=400$ $WEAPONS_B=100$. This yields intrinsic values of $IV_A=300$ and $IV_B=250$. In Game 1, substituting yields $V_A=260$ and $V_B=280$. Thus playing object A is intrinsically more valuable than playing object B but due to scaling, its valuation is less than that of B in Game 1 without normalization. This is because a particular attribute has been scaled to such an extent that it changes the overall relative value of the playing object. So, in order to maintain relative value, we calculate the normalization factors and apply them:

$$F_A=300/260$$

$$F_B=250/280$$

$Velocity_A=115.38$ $Guns_A=576.92$ $Velocity_B=357.14$ $Guns_B=89.29$

So we see that playing object A remains more valuable than playing object B in game 1 but that it also retains its feel of being slow and well armed. Playing object B remains less valuable than playing object A and retains its feel of being fast and lightly armed.

In Game 2, A and B's valuations prior to normalization are:

$$V_A=(SPEED_A+2.5(WEAPONS_A))/3.5$$

$$V_B=(SPEED_B+2.5(WEAPONS_B))/3.5$$

In our specific example:

$V_A=385.71$ $V_B=185.71$

Here A has a greater valuation than B in Game 2 before normalizing but its valuation is too much greater. So applying the normalization formulas:

$$F_A=300/385.71$$

$$F_B=250/185.71$$

$Responsiveness_A=77.78$ $swords_A=311.11$ $responsiveness_A=538.47$ $swords_B=134.62$ Note that the normalization factors change depending on the game. However, in Game 2, A is still the slower, more heavily armed playing object and B is still the faster, more lightly armed playing object. And, the normalization preserves the relative value of the two playing objects.

3. Forward and Backward Compatibility.

As mentioned, an embodiment of the invention can fill in default values for attributes which are used by a game but not included in the playing object. In the above mapping algorithm, the value for each missing playing object attribute is given the value that is the intrinsic value of that playing object. Thus the intrinsic value of the playing object, being an average, is unchanged and its worth in the undefined attributes are comparable to the overall worth of the playing object.

For example, using the playing object A above with a new attribute of STRENGTH that was defined after the creation of playing object A, then the new game would set STRENGTH=300 for playing object A. It would then go through its standard normalization procedure as described above to set the game-specific values for each of the attributes.

If on the other hand a new playing object is brought into an old game which does not recognize all of the attributes in the new playing object, the object's "extra" attributes can be ignored or can be averaged into the values of the attributes that are used by the game. Mathematically, since the intrinsic value of the playing object should remain the same, the system multiplies the values of the attributes that are used by the game by the ratio of the true intrinsic value divided by the average of the used attributes. In fact, this is exactly the above-described normalization algorithm where the relative value of the new attributes is considered to be 0.

For example, let playing object C have the following attributes:

SPEED$_C$=100

WEAPONS$_C$=500

STRENGTH$_C$=450; and hence

IV$_C$=350

Then if playing object C is used in Game 1 described above whose valuation formula is:

$$V=(1.5(SPEED)+WEAPONS)/2.5,$$

then the normalization factor for this playing object in the game is:

$$F_c=350/260$$

This yields game play values of:

Velocity$_c$=134.62

Guns$_c$=673.08

Note that playing object C has the same values for the attributes of SPEED and WEAPONS as does playing object A in the Game 1 example above. However, because the value of its STRENGTH attribute is greater than its intrinsic value, playing object C has both higher velocity and higher guns capability than does playing object A within Game 1.

The above procedure works the same whether the playing object has new attributes and the game was written before the new attributes were defined or if the game is merely designed to utilize a subset of the DNA attributes. Hence, game designers do not need to figure out how to map all numeric attributes into meaningful capabilities, thereby lessening the constraints of game design.

4. Preferred Game Design Mapping Guidelines

Preferably, each game will map a basic set of generic attributes to similar attributes to maintain look and feel, rather than simply assign an overall average value.

Some playing object attributes are numeric values, whereas others define membership in a class (such as race). The values of all of the numeric attributes preferably range over the same scale and hence are comparable. It is desirable (but not essential) that games be designed such that only the numerically defined attributes provide differential value to the playing object. For example, a game designer preferably should not use a RACE attribute as a modifier to a numerically defined attribute such as STRENGTH.

Another desirable (but not essential) feature of playing objects is that there be no inherent higher worth of one numerically defined attribute over another numerically defined attribute. In this situation, an "intrinsic value" of a particular playing object can be expressed as the average (or the sum) of the values of all of its numeric attributes. A playing object with a higher "intrinsic value" means that it "tends" to provide the player with a greater probability of a favorable outcome in a game or an event in a game, all other factors being equal. Such other factors might include game play choices, reaction time, all other playing objects in play, and so on. Also, in one embodiment, the rarity of playing objects is controlled such that the higher the intrinsic value, the more rare the playing object.

Note that in some situations the above mapping algorithm will not faithfully preserve the feel of the playing object. This can happen for playing objects that are terribly unbalanced in their attribute values. Playing object designers can avoid this problem by not creating playing objects where the feel is concentrated into a single attribute. Part of meeting this goal would be to create a sufficiently rich set of attributes that they are expressive of subtlety.

Game designers preferably also practice certain procedures to make good use of the value preserving algorithm. For example, it is desirable that games try to balance many attributes in the game play. This will let the algorithm give the user a real sense of preservation of both feel and value of the DNA. As another example, it is desirable that the game as much as possible makes use of the specific capability values that the algorithm has calculated. That is, it should avoid merely testing numeric values to see if it is greater or less than some fixed value. As another example, when comparing the numeric values of attributes in opposing playing objects to calculate the outcome of an event in a game, it is desirable that the ratio of two values be used and not the difference between the two values. Since the algorithm is performing its actions as a resealing, it is preserving the relative value between two attributes in their ratio, but not in their difference.

Note further that the algorithm as described above is based on a simple linear transformation of the attribute values in order to compute the valuation function for the game. In other embodiments, any valuation function can be used if it is the sum of functions for each individual attribute and that the individual attribute functions are invertible. The only feature that is lost if the individual attribute functions are not linear is that there is no denominator that allows for normalization of the valuation function. However, normalization of the valuation function is a convenience to the game designer, not a requirement of the algorithm.

The algorithm also can be extended to support randomization in order to make a game be less predictable from one instantiation to the next. Preferably all such randomization is limited in range such that the overall feel of the playing object remains substantially constant.

Intentional enhancement/degradation of the value of specific attributes can also be employed by the game designer. Again, however, it is desirable that such modifications be limited so as to preserve the overall feel of the playing object.

Although the algorithm does an automated mapping of generic playing objects into game-specific playing objects, the game designer may wish to "special case" certain playing objects. Including code that performs a particular mapping based on a particular playing object's unique identification is outside of, and in addition to, the above algorithm.

G. User Hardware Example.

Returning again to FIG. 1, the server 102 and the two clients 106 and 108 each include both hardware and software. In each case, the hardware can be any general purpose computer since no specific hardware platform is required. Alternately, other displays could be used, such as a network box, a dumb terminal, or a television. To aid understanding, however, FIG. 9 illustrates a typical hardware computer system platform on which the software might run for a client or server.

Figure 9:
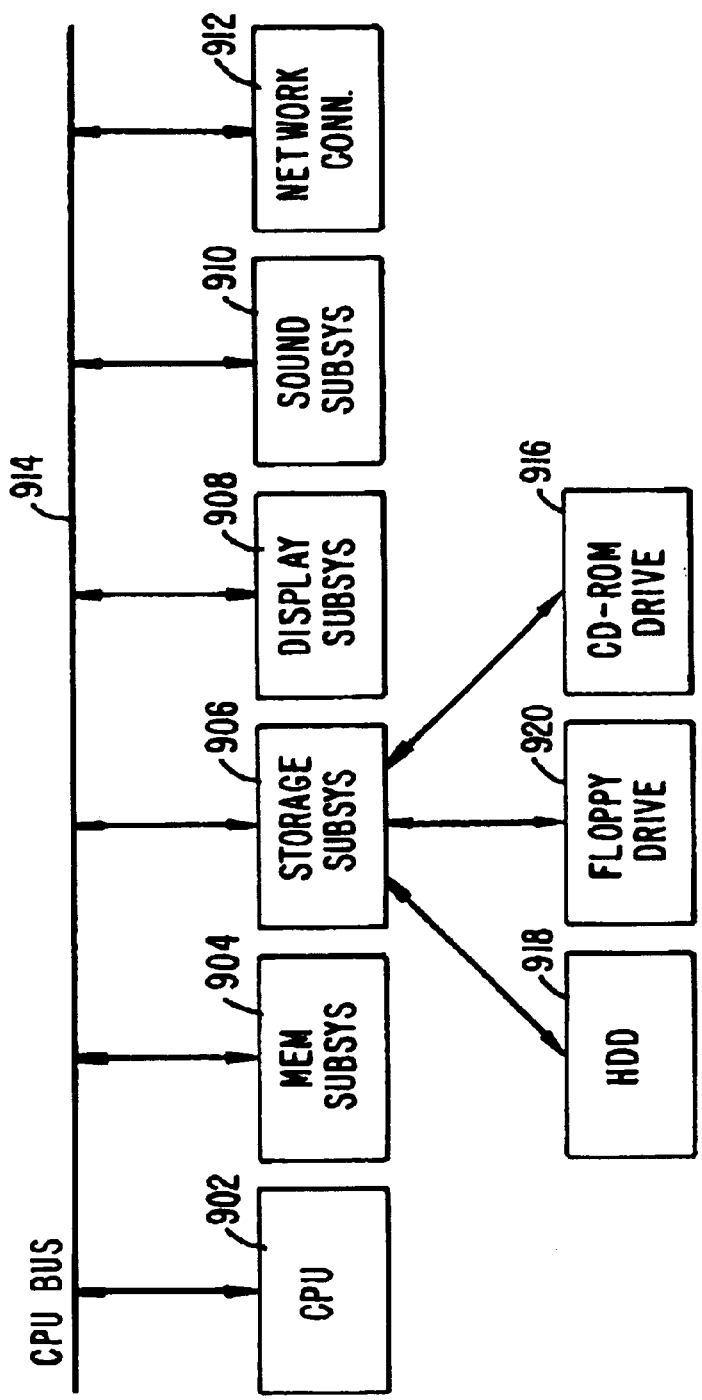
FIG. 9 is a block diagram of a typical hardware computer system platform of a user.

The hardware platform of FIG. 9 comprises a CPU 902, a memory subsystem 904, a storage subsystem 906, a display subsystem 908, a sound subsystem 910, and a network connection 912. These components are all shown connected to a single CPU 902, but it will be understood that in other embodiments, the CPU 902 can be replaced by two or more CPUs coupled together via one or more buses.

Connected to the storage subsystem 906 is a CD-ROM drive 916, a hard disk drive (HDD) 918, and a floppy disk drive (FDD) 920. Other storage units might also be included, such as PCMIA cards or tape drives. The memory subsystem 904 includes main memory, one or more levels of cache memory, and optionally a memory management unit. The display subsystem 908 includes a video monitor and the necessary driver hardware, as well as optionally graphics rendering hardware. Alternately, a television or monitor could be used. The sound subsystem 910 includes a speaker system together with appropriate amplifiers and driver hardware. The network connection 912 includes whatever hardware the system uses to connect to the network, such as a modem. In one embodiment, the graphics of a particular program or game are stored on one of the user's memory devices, while the connection to the network over network connector 912 allows interaction with a central server or other users, such as for the graphics of an opposing player's movements.

Whereas FIG. 9 illustrates a single computer system, it will be understood that the server 102 and/or the clients 106 and 108 can be made up of any "computer system structure". As used herein, a computer system structure can include one or more CPUs and/or other processors, can include parallel processors, distributed processors distributed locally or across a network, and so on.

Figure 10:
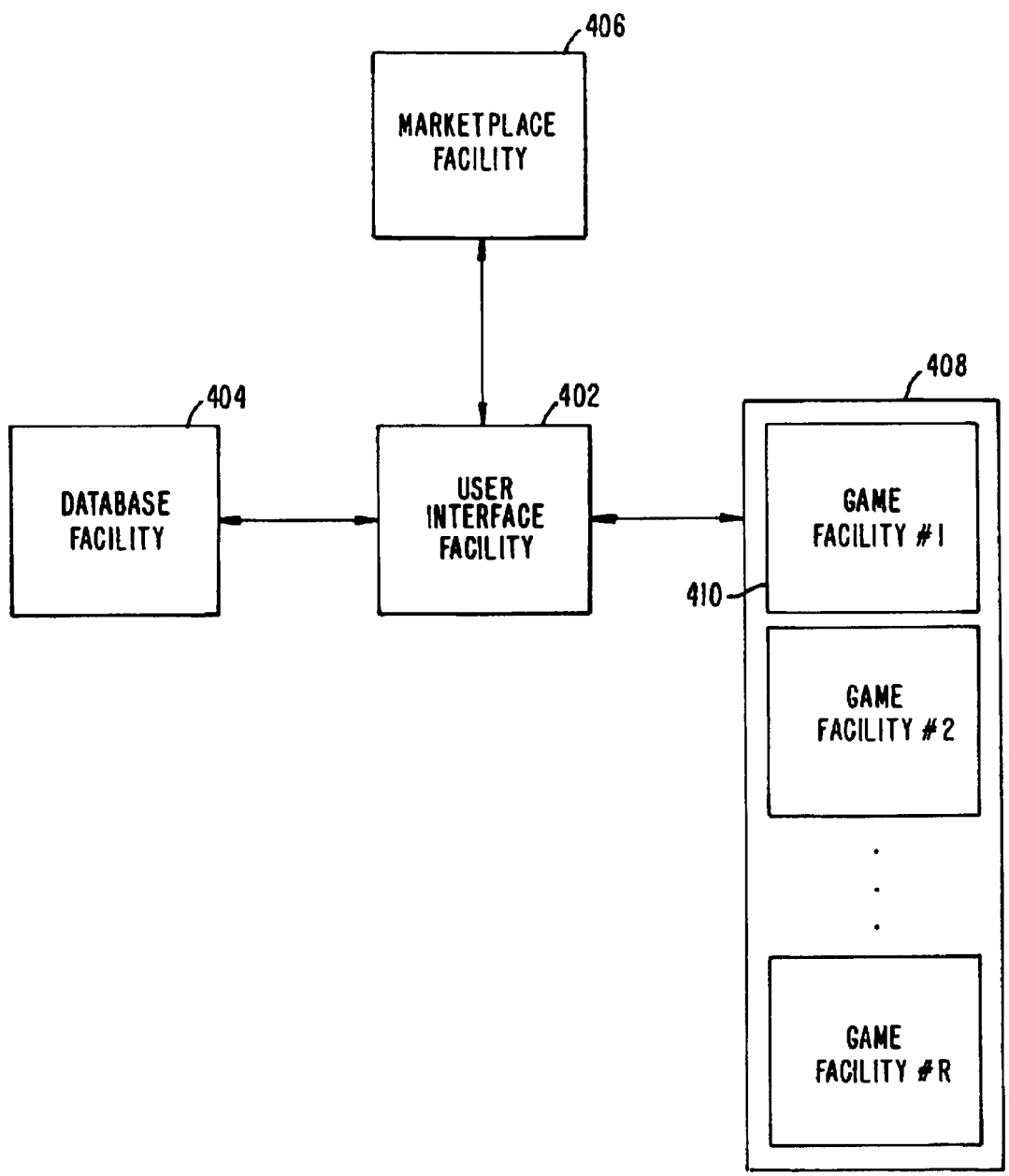
FIG. 10 is a block diagram illustrating the software architecture of a central server such as set forth in FIG. 1.

FIG. 10 is a block diagram of the software architecture of the server 102. It comprises a user interface facility 402, a database facility 404, a marketplace facility 406, and a gaming facility 408. A financial processing facility may also be included. The user interface facility 402 connects to the network 104, and provides the environment in which a user initially finds him or herself upon connecting to the server 102. The user interface facility 402 provides a number of services to users, one of which is to allow different users to rendezvous with each other, choosing teams or opponents, and selecting a game to play (if the server 102 supports more than one game). Once a game and a group of players are selected, the user interface facility 402 communicates this information to the gaming facility 408, which conducts the specified game among the specified users.

As shown in FIG. 10, the gaming facility 408 is programmed to conduct a number of different games. Specifically, game #1 facility 410 conducts a first game, and game #2 facility 412 conducts a second game.

As used herein, the term "facility" is merely a logical concept. In one embodiment, each of the facilities illustrated in FIG. 10 consists of software running on corresponding respective hardware computer systems, all of which are part of the central server 102 (FIG. 1). In another embodiment, all of the facilities illustrated in FIG. 10 represent separate software modules or tasks, all running on a single computer system platform with a single CPU. In yet another embodiment, the individual facilities illustrated in FIG. 10 are all integrated into a single overall software program running on one or more CPUs, but undifferentiated as individual software modules. Alternately, a distributed processing system could be used instead of a single central server.

The gaming facility 408 conducts games with reference to playing objects which have been associated with the individual users. The database facility 404 maintains the association between users and playing objects. The marketplace facility 406 allows users to manipulate these associations in a number of ways. For example, if a user acquires a CD-ROM from a retail outlet, the CD-ROM may entitle the user to a certain number of playing objects stored on a central server by providing an appropriate verification, such as a password. Alternately, the CD-ROM may contain the identities of a number of playing objects, or even the DNA data for the playing objects, and the user can register these playing objects with the server 102 by inserting the CD-ROM into the user's client 106 or 108 and interacting with the marketplace facility 406 on the server 102. The marketplace facility records the new association between the user and the new playing objects, using the database facility 404. As another example, a user can acquire new playing objects on-line from a central authority using the marketplace facility 406. In one embodiment, the user legally owns the playing objects which he or she acquires on-line through the marketplace facility 406. In another embodiment, the user merely licenses the playing objects which he or she acquires on-line. In either case, the system may require the payment of money or an obligation to pay money in the future to the central authority in return for acquisition of a playing object.

As another example, users may have the marketplace facility 406 transfer the association of a playing object from one user to another, with or without compensation, or can have the marketplace facility trade playing objects among users. In an embodiment, the marketplace facility is accessible from inside games as well as from outside the games.

The database facility 404 may implement the tables and lists of FIGS. 5 and 6 using standard relational database management software or any other suitable software. In addition, the database facility 404 can also perform other functions such as maintaining an accounting or a line of credit for each user; maintaining high-score records by user and/or by game; maintaining user passwords and authenticating signatures (digital or otherwise) for playing objects to be registered on the server; maintaining user demographic information; maintaining statistical data; maintaining handicaps for individual users; recording persistent modifications to playing objects resulting from game play; and disallowing the use of a playing object in a particular game session in accordance with exclusion criteria which were predefined for the playing object upon acquisition.

H. Marketplace Architecture.

Figure 11:
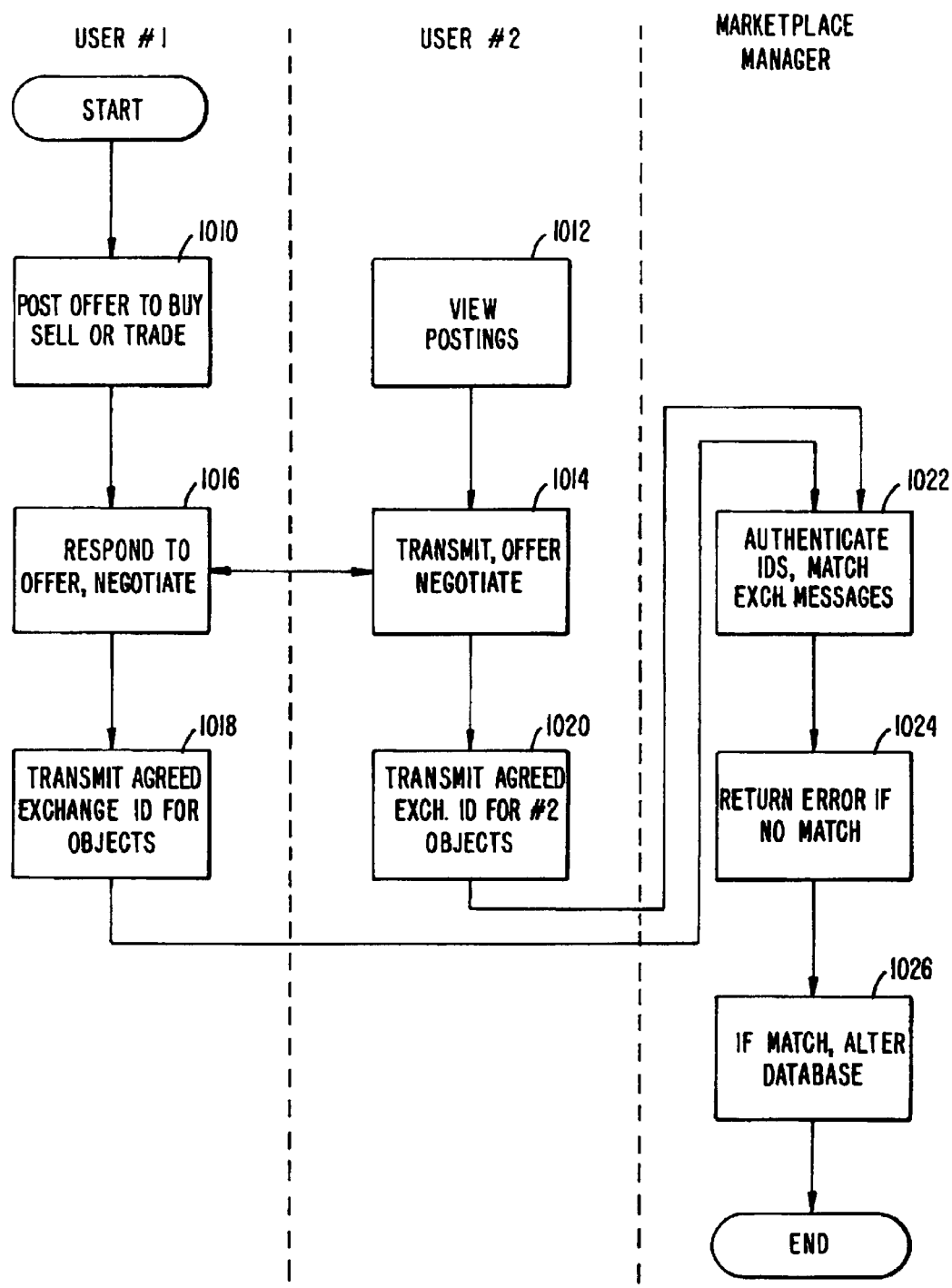
FIG. 11 is a flowchart illustrating the marketplace software according to one embodiment of the invention.

FIG. 11 is a flowchart illustrating one embodiment of the software supporting one embodiment of the marketplace used by the present invention. In a step 1010, a user can post a listing offering to buy, sell or trade particular playing objects which that user owns or is looking to acquire. A second user can view the listings in a step 1012. In a step 1014, the second user can make an offer to buy, sell or trade, which is then either posted or sent directly to user #1, who can then view it and respond, as indicated in step 1016. The two users can exchange messages with offers and counter-offers until both agree upon a particular exchange of playing objects for other playing objects or value (i.e., a charge to an on-line credit card account). Once agreed upon, user #1 in step 1018 transmits to the central gaming facility the agreed upon exchange of playing objects for both sides and the value for both sides, where applicable, along with the user ID for the playing objects owned by user #1. Similarly, user #2 in step 1020 transmits the same information on the agreed upon exchange, along with its ID number for the playing objects which it owns.

The central gaming facility, in a step 1022, will determine whether the agreed upon exchange matches between the two messages. In addition, it determines whether each user indeed has ownership of the playing objects it intends to exchange by comparing the user ID numbers submitted to those associated with the playing objects in its database. If either of the IDs do not show ownership, or the agreed exchange descriptions don't match, an error message is returned (block 1024). If there is a match, the central database is updated to switch the playing objects to the appropriate user Ids in accordance with the exchange as set forth in step 1026.

The marketplace could be implemented in alternate ways. For example, each user could have a marketplace program, with only playing object identities and bids being sent to another user in a peer-to-peer arrangement. In another embodiment, the marketplace could be conducted within a game.

I. User Interface Facility (Example Screens).

The following example of one embodiment of certain portions of the user interface will help illustrate the operation of the invention. Effectively, a menu-based system is implemented for the initial set of screens, allowing the user to navigate through various menus which are linked together by hypertext link. These menus, or screens, are described below. When a client such as 106 logs onto the server 102, it communicates initially with the user interface facility 402. The user interface facility first requests the user's identity from the client 106, or, for a new user, prompts the user to establish a user identity.

Introductory Screen

When the client (106, for example) first connects to the central server 102, the user interface facility 402 displays an introductory screen. This screen has registration forms for playing the games' supported by the system, order forms for acquiring products for use in or related to the system or its games, and a link to a system login screen.

System Log-In Screen

A system log-in screen lets newcomers view the available games and download demonstration versions to the client. For an example game described in more detail below, the demonstration version includes pre-generated characters and playing object decks. Authorized users with a valid character (Playing Object) can go directly to the Chat Room to find opponents.

Main functions:
1. GAME VIEWER
2. DOWNLOAD BUTTON
3. Links to registration and order forms
4. Links to each of the available games
5. Link to central authority's home page
6. Link to Character Creator
7. Link to Playing Object Viewer
8. Link to Chat Room Playing Object Viewer This screen lets the user examine the user's playing objects and see how they work in the available games. The default view is the "Master Playing Object" that is external to (and generic to) the games themselves. This view presents the playing object in the game-generic form described above. At the bottom of the screen are icon buttons, one for each of the available games. Selecting an icon changes the playing object picture and description, showing how the object appears and is used in that game. This screen can be used in conjunction with a Deck Builder screen for a particular game to create the play decks.

Main functions:
1. GAME ICON BUTTONS
2. PREVIOUS BUTTON
3. Link to Deck Builder
4. Link to Character Creator
5. Link to Chat Room
6. Link to Game Options Chat Room This area serves a number of uses in the system including discussing playing object sales and challenging other users to play or compete.

Main functions:
1. USER CHAT BUTTONS
2. Link to Character Creator
3. Link to Save/Load Character
4. Link to Trade Room
5. Link to Bulletin Boards
6. Link to Hall of Fame
7. Link to Challenge
8. Link to Game Options
9. Link to Introductory Screen for particular game Trade Room Users who wish to sell, trade or give away playing objects use this screen, which is managed by marketplace facility 406. All transactions are conducted privately via user interaction. Finalized trades are registered with the server 102 and the database facility 404 enters the trade into the master user database.

Main functions:
1. PLAYING OBJECT AUCTION
2. PLAYING OBJECT TRADE
3. REGISTER PLAYING OBJECT TRANSFER BUTTON
4. Link to Chat Room
5. Link to Character Creator
6. Link to Save/Load Character
7. Link to Game Options Bulletin Boards The user interface facility 402 supports a number of bulletin boards on which users can post messages.

Halls of Fame

This screen shows the top ten ranked users and clubs.

J. Gaming Facility

The gaming facilities 410 and 412 are implemented as additional clients of the user interface facility 402. The act of launching a game therefore does not require clients such as 106 to disconnect from the user interface facility 402. Launching a new game is accomplished by sending a message to a game facility indicating that it should launch a new game instantiation with a list of the identities of all the players.

While a group of users are playing a game, the public game flow control traffic from the game facility to the clients may be directed through the user interface facility 402 via a communications channel which is similar to an Internet Relay Chat (IRC) channel. In this way, observers can join the channel to watch the traffic. Player chat traffic may be directed through a second IRC-like channel, which the user interface facility 402 could repeat on the first channel so that observers can see the player chat, but not vice versa. Alternately, the observers may chat with the players. Private information (i.e., game control information) could be exchanged between clients and the gaming facility 408 directly, rather than via an IRC channel.

A running game facility 408 manages all instantiations of a given game. It knows which users are players in the instantiation, and executes game commands from them. It notifies all interested parties (including both players and observers) of game events by multicasting through the user interface facility 402.

When the game facility launches an instantiation, it registers its identity as a game facility with the user interface facility 402, specifying what multicast channels it intends to use to notify players and observers of game events. During game play, the game facility may communicate information with the database facility 404 via the user interface facility 402, regarding game events which have persistent effects on users' profile or on playing objects. At a minimum, the database facility 404 is notified of the outcome of the game instantiation.

K. Modification of Generic Playing Object Value.

In one embodiment, the value of a playing object may be modified (permanently or for a period of time) as a result of activity in a game, such as injuries impacting a playing object's health. Alternately, the playing object may be lost altogether, such as by dying or being captured by another user. As mentioned, playing objects are represented in the system of FIG. 1 as a collection of attributes, each of which has a value. A persistent change in the health of a playing object is represented by a persistent change in one or more of the values in the playing object. When this occurs, referring back to FIG. 10, a particular game facility 410 communicates the information to the database facility 404 for recording. In an embodiment in which the mapping of playing objects to game-specific objects includes temporary weighting of attribute values according to game-specific importance values (as described in more detail below), the system performs an appropriate reverse mapping in order to determine the correct modification to be made to the values in the generic representation of the playing object as maintained in the database facility 404. Also, at an appropriate time, if the playing object exists in part at the client 106, the system 102 downloads the modified playing object onto the client 106 hard disk drive. The values in the hard disk drive copy of the playing object will supersede any that are stored on the user's CD-ROM for purposes of the browser utility (or a version number may be assigned. In alternate embodiments, the CD-ROM contains pre-computed mappings for different games, and the central server could download ten new pre-computed versions of the persistently modified playing object (plus the one generic version), or it could download only the modified generic version, with all game-specific versions thereafter being computed on the fly or as needed.

L. Overall Operation of the System—User's Viewpoint.

Figure 12A:
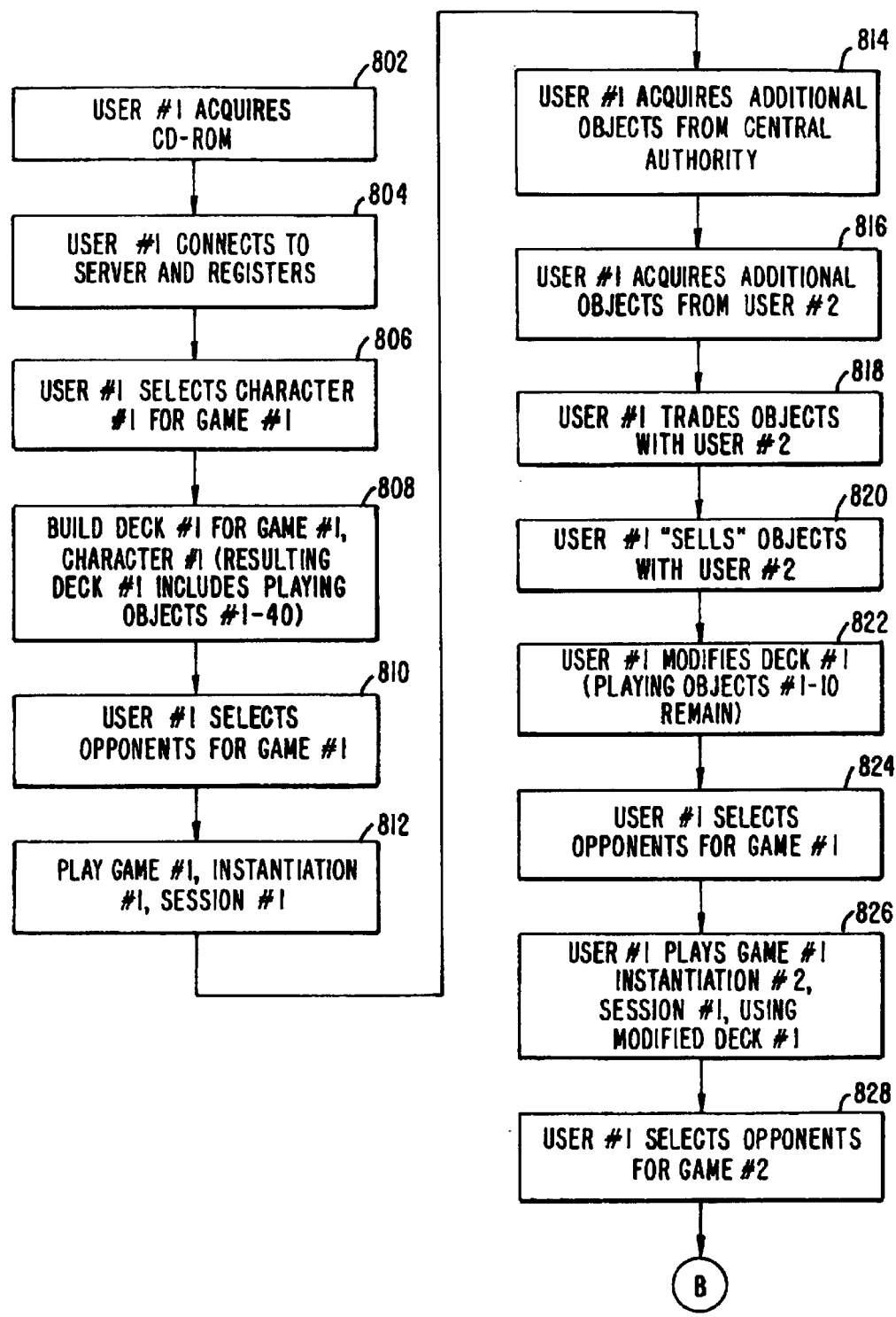
FIGS. 12A and 12B (sometimes referred to herein collectively as FIG. 12) are a flowchart illustrating a sample set of activities that a user can perform using the above—described system.
Figure 12B:
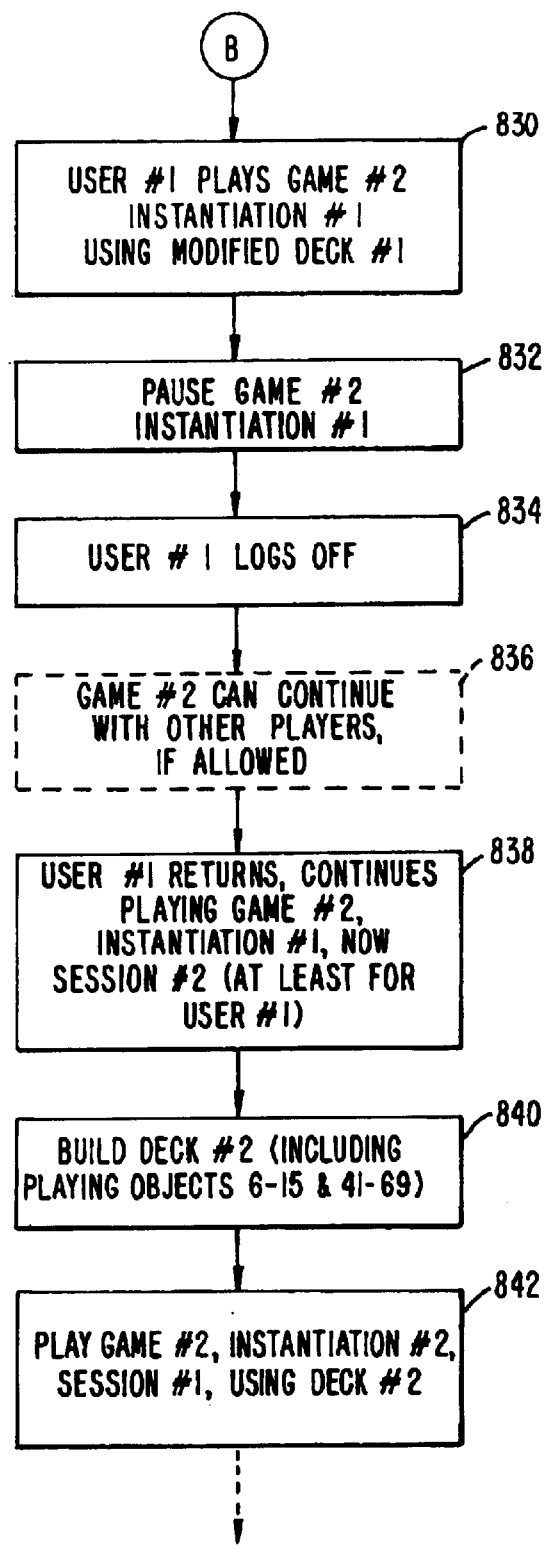

FIGS. 12A and 12B (sometimes referred to herein collectively as FIG. 12) is a flow chart illustrating a sample set of activities that a user can perform using the above-described system. Beginning at step 802, the user (referred to as user #1) acquires a CD-ROM from a retail outlet. The CD-ROM contains client software for two games (game #1 and game #2), as well as legacy data and most attribute values for 300 playing objects. These playing objects are represented on the CD-ROM in generic form, as well as in a form pre-computed for game #1 and in a form pre-computed for game #2. Of the 300 playing objects, 240 are locked, leaving the user with an initial set of 60 available playing objects. Also, not all of the attribute values required for game play are present on the CD-ROM; some exist only on the server 102 and are downloaded to the client 106 only during game play.

In step 804, user #1 connects to the server 102 via the network 104 and his or her client 106. At this point the user is communicating with the user interface facility 402. After authentication (for example, a user password is verified), the client 106 communicates with the user interface facility 402 and registers the user's initial set of 60 playing objects. At this point the user interface facility 402 communicates with the client 106 and determines that a new game, game #3, is available in the gaming facility 408 but that the client 106 does not yet have the necessary client software. The user interface facility 402 informs the user via the client 106 of the availability of game #3, and asks whether the user would like to download the client software presently. If the user responds affirmatively, then the software is downloaded to the client 106 via the network 104. Pre-computed playing objects may be downloaded at this time as well.

In a step 806, user #1 selects a character #1 for use in game #1. In step 808, user #1 builds a deck #1 (i.e. selects a subset of his or her available playing objects) for use in game #1 by character #1. For purposes of this illustration, it is assumed that deck #1 includes 40 playing objects numbered 1–40.

While the user could play game #1 solitaire if desired, it is assumed for purposes of FIG. 8 that he or she wishes to play competitively. Therefore, in a step 810, user #1 enters a chat room of the user interface facility 402 and selects opponents for game #1. This information is communicated to the gaming facility 408, and in step 812, the user proceeds to play game #1, in a first instantiation and a first session. Depending on the outcome of the events in the game, one or more of the attribute values in the objects in deck #1 might be persistently modified. One or more attribute values of an object might be persistently modified at this point also due to non-play factors, such as being modified in dependence upon the value of an attribute which is hidden in the playing object.

After completion of the game instantiation, in step 814, user #1 acquires additional objects from the central authority by communicating with the marketplace facility 406 via the client 106, the network 104 and the user interface facility 402. In step 816, user #1, still in the marketplace facility 406, acquires additional objects from another user, user #2. In step 818, user #1 trades objects with user #2, and in step 820, user #1 transfers objects to user #2 in return for consideration of some kind. The marketplace facility 406 registers the results of steps 814, 816, 818 and 820 with the database facility 404.

In a step 822, user #1 modifies deck #1 by removing playing objects 11–40 and adding playing objects 41–50. User #1 registers the new version of deck #1 with the database facility 404 via the user interface facility 402. In step 824, user #1 selects opponents for a second instantiation of game #1. This information is communicated by the user interface facility 402 to the gaming facility 408. In step 826, user #1 proceeds to play game #1, instantiation #2, session #1, using the modified deck #1.

After completion of game #1, instantiation #2, in step 828, user #1 enters the chat rooms in user interface facility 402 again, but this time to select opponents for an instantiation of game #2. (The flow chart of FIG. 12A now continues in FIG. 12B, as indicated by the circled symbol "B" appearing in both figures.) In step 830, user #1 proceeds to play game #2 in a first instantiation, using the same modified deck #1 (including playing objects 1–10 and 41–50).

Because of the lateness of the hour, in step 832, user #1 pauses game #2 instantiation #1 and logs off for the evening (step 834). This completes session #1 of instantiation #1 of game #2, at least as far as user #1 is concerned. However, game #2 in one embodiment is designed to allow the remaining players to continue playing even in the absence of user #1. Another embodiment does not permit this. Accordingly, depending on the embodiment, the game #2 instantiation can continue with the remaining players as indicated by dashed step 836 in FIG. 12B.

The next morning, user #1 returns and continues playing game #2, instantiation #1 (step 838). At least for user #1, the current session is now considered session #2 of instantiation #1 of game #2.

After completion of the game instantiation, in step 840, user #1 builds a new deck of playing objects, deck #2. Deck

2 includes playing objects 6–15 and 41–69. It can be seen that the set of playing objects in deck #2 is not equal to the set of playing objects in deck #1, although some playing objects are common to both decks. In step 841, user #1 begins a new instantiation of game #2, using the new deck #2. The process then continues with steps similar to those previously described.

M. Mutation, Replication, Recombination.

In one embodiment of the invention, the DNA of playing objects can be modified over time, either by a central administrator or the users themselves. The playing objects may simply be duplicated, or they may mutate, replicate, recombine, regenerate, repair, otherwise modify or some combination. For example, multiple playing objects, or simply portions of the DNA from multiple playing objects, could be recombined into one or more different playing objects.

The playing object registration system of the present invention allows controls over such modifications of a playing object by a user. A user can be required to register any new playing object before being able to import that playing object into a game. The registration, or verification of earlier registration, could be done as part of the game, or immediately prior to playing a game on the network. Alternately, a user could obtain an authorization code for a peer-to-peer game.

In another embodiment, a user can be allowed to create a playing object, with the playing object requiring registration before it can be used in any game. The playing object creation or modification could occur through role-playing or otherwise in a game or other program.

N. Playing Object Use Outside Games.

The playing objects of the present invention, or representations of them, may have an existence outside of any game. As pointed out above, they may be viewed with a browser or traded in a marketplace. They may be represented with cards, action figures, or other physical items. They may be imported into other programs, for example aspects of a playing object (i.e., its legacy data) could become part of a screen saver, or could be used as part of audio-visual addressing in an e-mail program. Alternately, a playing object could be used in an interactive story-telling program.

A playing object may be stored on a user's local memory with use authorized in a manner similar to electronic cash (e-cash), with a verification or authorization code, which may be encrypted, allowing use of the playing object independent of any central server.

The foregoing description of preferred embodiments of the present invention has been provided for the purposes of illustration and description. It is not intended to be exhaustive or to limit the invention to the precise forms disclosed obviously, many modifications and variations will be apparent to practitioners skilled in this art. For example, the playing objects could be mapped and traded independently of an electronic network. Also, playing objects might be used in programs that aren't games, such as a video or a teaching program. In addition, mapping could be done without a computer program to generate products with pre-computed game specific playing objects. Alternately, a playing object may be used in different games without any mapping. Programs could be combined or separated in a variety of manners. For example, a separate program could be used for viewing, mapping, or simply selecting playing objects, which are then presented to a separate game or marketplace program. Accordingly, it is intended that the scope of the invention be defined by the following claims and their equivalents.

What is claimed is:

1. An apparatus accessible via a network comprising:

a processing device;

a memory coupled to said processing device;

a database on said memory storing a plurality of playing objects that are used in at least one video game, each playing object being associated with an ID field for designating a user, each playing object being unique and being associated with one user at any given time, each playing object being a data object with a collection of attributes; and a marketplace program having instructions facilitating the sale or exchange of said playing objects between users, independent of a distributor of said video games; and said marketplace program, upon a sale or exchange of a playing object, changing said ID field to designate an acquiring user in response to a verified message from a relinquishing user having an ID associated with said playing object.

2. An apparatus comprising:

a central server including a database for storing at least a portion of playing object data, at least one playing object being associated with a particular user, each playing object being a data object with a collection of attributes;

a user processing device programmed to play a game using said playing object;

a transfer program for transferring said portion of playing object data over a network independent of said game for use in said game;

a viewing program for viewing said playing object independent of said game; and a user ID associated with said playing object, such that said playing object is unique to said user and modifications of said playing object do not affect other playing objects used in said game.

3. An apparatus comprising:

a plurality of processing devices;

a network interconnecting said processing devices;

at least one game program at least partially stored with one of said processing devices connected to said network;

a processing device readable media including a digital representation of a playing object, capable of manipulation by said game program running on a processing device, and capable of being transmitted separately from said program, each playing object being a data object with a collection of attributes; and a database storing a user identification associated with an identification of one of said playing objects, said playing object being unique and being associated with only one user at any given time.

4. The apparatus of claim 3, wherein said media is accessible independent of said network, and further comprising:

a program for manipulating said playing object for one of creation, mutation, replication and recombination to generate a revised playing object; and a plurality of instructions, stored in a memory connected to said network, for preventing use of said revised playing object in said game without prior registration in said database.

* * * * *